April 18, 1961     J. M. GILL ET AL     2,980,284
SELF-SEALING GASKET
Filed Aug. 30, 1957
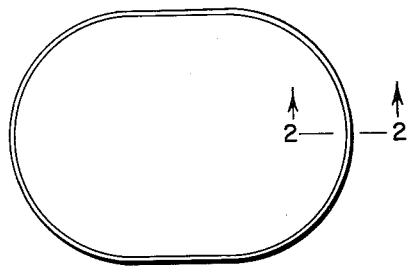
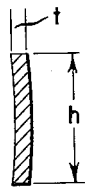
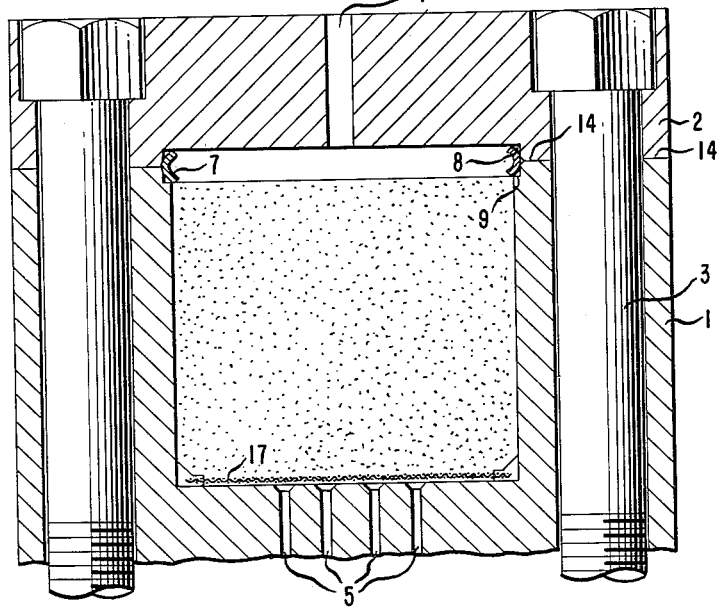
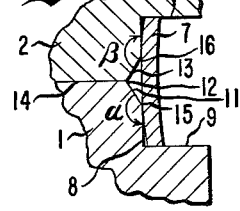
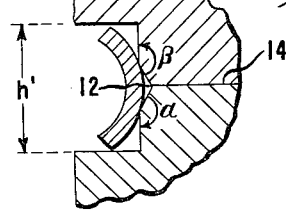
INVENTORS
JAMES M. GILL
CLEVELAND L. HILDEBRAND
BY *Raymond E. Blomstedt*
ATTORNEY

United States Patent Office 2,980,284
Patented Apr. 18, 1961

2,980,284
SELF-SEALING GASKET

James M. Gill, Wilmington, and Cleveland L. Hildebrand, Delmar, Del., assignors to E. I. du Pont de Nemours and Company, Wilmington, Del., a corporation of Delaware Filed Aug. 30, 1957, Ser. No. 681,328

5 Claims. (Cl. 220—46)

This invention relates to pressure seals and, in particular, to a pressure seal capable of withstanding high pressures and temperatures.

In the melt-spinning of polymers, it is customary to force the molten polymer through a filter, such as a sand filter in combination with suitable screens, to remove particles which might clog the spinneret or impair the quality of the yarn. Pressures in these filtering devices may range from a few hundred pounds per square inch (p.s.i.) to as high as 10,000 p.s.i. for high denier yarns spun from relatively high viscosity polymer. Temperature of the molten polymer during filtration is also relatively high, usually in the range of 200° C. to 300° C. One type of spinneret and filter assembly is described in U.S. 2,266,363 to Graves.

At high pressures, difficulty has been encountered in finding adequate means for sealing the filter assembly to prevent leakage of the polymer. Gaskets which seal by being compressed between the two parts forming the seal are not satisfactory because at high polymer pressures the degree of compression required to hold the gasket in place is excessive, and even with a high compressive force these gaskets frequently fail. Various types of self-sealing gaskets made of rubber or other elastomeric material are known, but these materials do not withstand the temperature required for melt-spinning of polymers. Metal gaskets are also known, but the metal gaskets of the prior art either do not withstand the required pressures or have a seating arrangement which does not provide an adequate seal.

It is an object of this invention to provide an improved pressure-sealing means which requires very little compressive force for a satisfactory seal.

Another object is to provide a sealing means such that the seal becomes tighter as the pressure tending to break the seal increases.

Another object is to provide a sealing means which is effective at high pressures and temperatures and which may be fabricated at low cost.

A further object is to provide a sealing gasket which is effective for preventing fluid from passing between contiguous rough metal surfaces and which does not require exact alignment of the contiguous surfaces.

The invention will be more readily understood by referring to the drawings. Figure 1 is a top view of a preferred gasket of this invention, being in the form of a continuous band of metal.

Figure 2 is a cross-sectional view 2—2 of the gasket of Figure 1. The height of this particular gasket is indicated by (h). The gasket is concave inward (from top to bottom), as shown in Figure 2, so that the circumference of the continuous gasket is somewhat less at the top and the bottom than at the mid point. The cross-sectional thickness (t) of the gasket is preferably uniform, although for particular applications non-uniformity may be desirable.

Figure 3 illustrates the functioning of a gasket of this invention in a container designed for filtering polymeric material preparatory to spinning the polymer into fibers. The container comprises a body 1 and a lid 2 which is releasably joined to the body by threaded bolts 3, the contiguous rims of the body and lid forming juncture surface 14. In this application of the container, the body cavity contains sand as a filter medium. Fluid is admitted to the container through conduit 4 and emitted through conduits 5. Screen 17 prevents entrainment of sand. Juncture surface 14 forms an annular juncture line 12 about the periphery of the interior wall of the container, which is in the form of a smooth curve, concave inward, and preferably circular or oval in shape. In the enlarged sections of the container and gasket, as shown in Figures 4 and 5, a V-shaped annular recess concave inward is positioned with its apex along the junction line 12, and, in the particular embodiment shown, this annular recess is positioned in the center of groove 8 which has a substantially rectangular cross section and provides shoulders 9 and 10 for seating the gasket at low pressures. The walls of the V-shaped recess 11 and 13 intersect the vertical wall of the rectangular groove at 15 and 16 to form angles $\alpha$ and $\beta$. Preferably, each of these angles will be between about 135° and about 160°; 150° appears to be optimum for most purposes. It is not necessary that angle $\alpha$ equal angle $\beta$, but there is no advantage in having these angles unequal, and it is usually more convenient in manufacturing the container to make them equal.

The primary purpose of edges 15 and 16 is to provide an abrupt corner which bears strongly against the gasket as the internal pressure is increased, and around which the gasket is deformed at high pressure to provide a tight seal. While the angles $\alpha$ and $\beta$ must provide an abrupt corner, an angle which is too sharp may result in failure of a gasket due to excessive stress as it is bent sharply around the corner and forced into the V-shaped groove. The height of the V-shaped groove may also vary, depending on the other dimensions employed; however, the ratio of the height of the V-shaped groove (distance from edge 15 to 16) to the over-all height of the seating groove is preferably from about 0.4 to about 0.6 and the optimum ratio appears to be about 0.5

Figure 4 shows the position of the gasket in groove 8 after closing the container and prior to the application of the gasket deforming high pressure. The height (h) of the gasket is preferably slightly greater than the height (h') of groove 8 so that upon firm closure of the container with bolts 3 the gasket is slightly compressed and the top and bottom edges of the gasket make continuous contact with the upper and lower shoulders 9 and 10 of groove 8. Thus, the gasket effectively seals the container at low pressures. This seal at the groove shoulders is important during the initial filling of the container with fluid, at which time pressures are relatively low and the high pressure seal described hereinafter is incompletely activated. Some leakage around the gasket at low pressure is permissible so long as it is not sufficient to unduly delay completion of the high pressure seal.

The high pressure seal of this invention is activated by increasing fluid pressure inside of the container. As fluid pressure increases, the gasket is forced against recess edges 15 and 16, forming a secondary seal along those edges, which is further tightened by additional increases in fluid pressure. When the pressure is sufficiently great, the gasket is forced partially into the V-shaped recess, and, if the pressure is increased enough, the initial shoulder seal is broken as shown in Figure 5. Edges 15 and 16 provide abrupt corners which bear strongly against the gasket as the internal fluid pressure is increased, and the gasket is deformed about these abrupt corners to provide a tight "recess seal." This "recess seal" illustrated in Figure 5 is, of course, merely strengthened by increases in pressure and is limited in strength only by the strength of gasket and container materials.

The gasket of this invention is simply a band formed to the shape of the joint to be sealed. Preferably, the gasket (from top to bottom) has a convex outer periphery and a concave inner periphery, as illustrated in Figure 2. The material of which the gasket is formed is not critical except that it must be strong enough to withstand the pressures and temperatures used and yet undergo some deformation at these pressures and temperatures. Metal gaskets are preferred as best satisfying these conditions. At moderate pressures and temperatures, lead is satisfactory, and at very high pressures and temperatures stainless steel may be used. Generally, in the melt-spinning of polymers, aluminum or copper gaskets are preferred since these gaskets deform sufficiently under the conditions employed to give a good seal and yet are hard enough to prevent rupture of the gasket at high pressures. Various alloys of aluminum and copper may likewise be used.

The seating arrangement and the relative dimensions of the gasket and seating groove are critical to the success of the seal of this invention. As mentioned previously, the height ($h$) of the gasket should be slightly greater than the height ($h'$) of the seating groove to provide a seal against initial pressure. For copper and aluminum gaskets, this difference in height is preferably 0.006 to 0.015 inch. Gaskets of more resilient materials may be slightly larger and vice versa. The peripheral shape and dimensions of the gasket should conform closely to that of the seating groove with only a slight clearance between the outer periphery of the gasket and the groove. A clearance of about 0.001 to 0.005 inch is preferred.

The following examples illustrate the advantages of the invention. All parts and percentages are by weight unless otherwise indicated.

*Example I*

A small pressure vessel having an oval shaped cavity (cross section) as in Figure 1 (1.72 x 2.75 inches) and a depth of 4 inches is fitted with an aluminum gasket as shown in Figure 3. The cross-sectional height and thickness of the gasket are 0.26 inch and 0.03 inch, respectively. The gasket has a convex outer periphery and a concave inner periphery, as shown in Figure 2, the radius of curvature (top to bottom) being approximately 15 inches. Height of the seating groove is 0.25 inch so that the gasket is compressed slightly when the lid is firmly bolted in place. Height of the V-shaped groove (distance between edges) is 0.125 inch, and angles $\alpha$ and $\beta$ are each 150°. Upon filling the vessel with oil and increasing the pressure to 21,000 p.s.i., there is no leakage of oil.

*Example II*

Polyhexamethylene adipamide is melted and brought to a temperature of 280–295° C. in the conventional manner. The molten polymer is then pumped through a spinneret filter assembly fitted with a gasket, as illustrated in Figure 3. The sand cavity of the filter assembly is oval in shape, and the container is fitted with an annealed copper gasket. The major diameter of the oval gasket is 2.6 inches, and the minor diameter 1.85 inches. Other dimensions of the gasket and the dimensions of the seating groove are as described in Example I. When molten polymer is pumped through the spinneret filter assembly at pressures in the range of 4,000 to 8,000 p.s.i., the pressure increasing with continuing use of the assembly, there is no leakage of polymer.

The pressure seal of this invention is particularly effective in the melt-spinning of polymers, but it may be used to advantage in many applications where sealing at high pressures and temperatures is required. In addition to functioning effectively at high pressures and temperatures, the pressure seal of this invention requires relatively little initial compression on the gasket; it does not require highly accurate alignment of the parts to be sealed, and it will prevent fluid leakage between very rough contiguous metal surfaces.

The claimed invention:

1. A container for holding fluid at superatmospheric pressure which comprises a body portion releasably joined to a lid, the contiguous surfaces of the body and lid forming an annular junction line about the interior of the container within an annular groove of substantially rectangular cross section having upper and lower shoulders for seating a gasket, a V-shaped annular recess positioned in said annular groove and concave inwardly with the apex of the recess running along said junction line, the walls of the V-shaped recess forming angles of between about 135° and about 160° with the interior walls of the container to form abrupt annular corners at the outer extremities of said recess walls, and a gasket in the form of a metal band contacting all points along said corners, the metal band having an initial height which is slightly greater than the cross-sectional height of said groove and being compressed between said upper and lower shoulders to form a pressure-tight seal until sufficient pressure is applied to seal the band tightly against said corners of the V-shaped recess.

2. A container for holding fluid at superatmospheric pressure which comprises a body portion releasably joined to a lid, the contiguous surfaces of the body and lid forming an annular junction line about the interior of the container within an annular groove of substantially rectangular cross section having upper and lower shoulders for seating a gasket, a V-shaped annular recess positioned in said annular groove and concave inwardly with the apex of the recess running along said junction line, the walls of the V-shaped recess forming angles of between about 135° and about 160° with the interior walls of the container to form abrupt annular corners at the outer extremities of said recess walls, and a gasket in the form of a metal band contacting all points along said corners, the metal band having an initial height of up to 0.015 inch greater than the cross-sectional height of said groove and being compressed between said upper and lower shoulders to form a pressure-tight seal until sufficient pressure is applied to seal the band tightly against said corners of the V-shaped recess.

3. The container of claim 2 in which the height of the metal band is between about 0.006 and about 0.015 inch greater than the height of the groove.

4. The container of claim 3 in which the metal is aluminum.

5. The container of claim 3 in which the metal is copper.

References Cited in the file of this patent

UNITED STATES PATENTS

| | | |
|---|---|---|
| 1,339,636 | Tulloch | May 11, 1920 |
| 1,483,499 | Allee | Feb. 12, 1924 |
| 1,904,250 | Purvis | Apr. 18, 1933 |
| 2,641,381 | Bertrand | June 19, 1953 |
| 2,647,656 | Frisch | Aug. 4, 1953 |

FOREIGN PATENTS

| | | |
|---|---|---|
| 264,744 | Italy | May 10, 1929 |
| 493,575 | Great Britain | Oct. 11, 1938 |